United States Patent [19]

Ruhl

[11] Patent Number: 4,500,275

[45] Date of Patent: Feb. 19, 1985

[54] QUICK CHANGE LOCATOR CLAMP ASSEMBLY FOR PLASTIC MOLDING MACHINE

[75] Inventor: Edward A. Ruhl, Southfield, Mich.

[73] Assignee: Sharp Die & Mold Company, Inc., a subsidiary of R & R Plastic Material, Inc., Fraser, Mich.

[21] Appl. No.: 564,686

[22] Filed: Dec. 23, 1983

[51] Int. Cl.³ ............................................. B29F 1/06
[52] U.S. Cl. ............................. 425/192 R; 425/185; 425/195; 249/139
[58] Field of Search ..................... 425/17, 19, 21, 22, 425/23, 24, 25, 182, 185, 192 R, 193, 195, 451.2, 451.3, 451.4, 451.5, 451.6, 451.9, 589, 590, 591, 592, 593, 595, 542, 107; 249/139

[56] References Cited

U.S. PATENT DOCUMENTS

| | | | |
|---|---|---|---|
| 3,104,433 | 9/1963 | Hoern | 425/590 X |
| 3,189,427 | 6/1965 | Schirm | 425/451.6 X |
| 3,199,159 | 8/1965 | Werneche | 425/595 X |
| 3,233,284 | 2/1966 | MacMillan | 425/19 |
| 3,583,035 | 6/1971 | Niller | 425/195 X |
| 4,009,979 | 3/1977 | Martin | 425/107 |
| 4,235,579 | 11/1980 | Hehl | 425/107 |
| 4,268,242 | 5/1981 | Natter | 425/182 |
| 4,370,112 | 1/1983 | Sorbier | 425/451.9 X |

Primary Examiner—J. Howard Flint, Jr.
Attorney, Agent, or Firm—Cullen, Sloman, Cantor, Grauer, Scott & Rutherford

[57] ABSTRACT

In a plastic or die cast molding machine having opposed stationary and movable platens adapted to receive, mount and support a sectional plastic or die cast molding die having stationary and movable clamp plates, opposed quick change locator clamp assemblies mounted upon the platens, each clamp assembly including a body plate secured to a platen. Laterally spaced index pins project from the body plate for receiving corresponding spaced locator slots in the clamp plates. Longitudinally spaced opposed pairs of plate clamps are adjustably and guidably mounted upon opposite sides of the body plate adapted to receive and retainingly engage opposite sides of a clamp plate. A manually rotatable screw having right and left hand threads adjacent it opposite ends threadedly engages the corresponding opposed plate clamps for simultaneously moving each pair of plate clamps inwardly to retain a clamp plate or in the opposite direction to disengage the clamp plates and facilitate removal of the sectional die from the platens.

15 Claims, 10 Drawing Figures

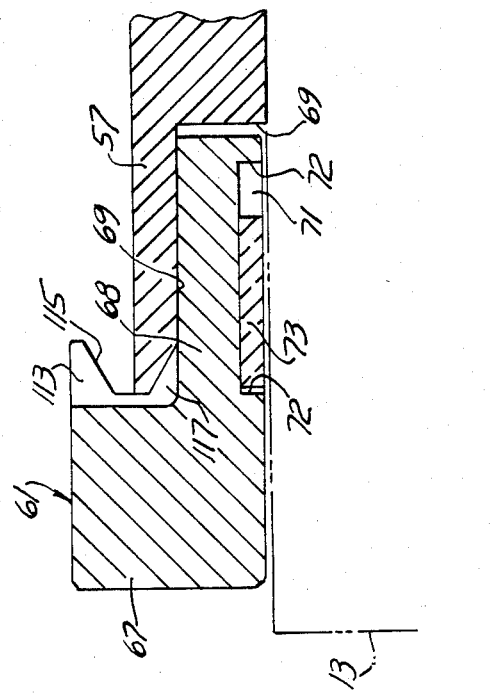
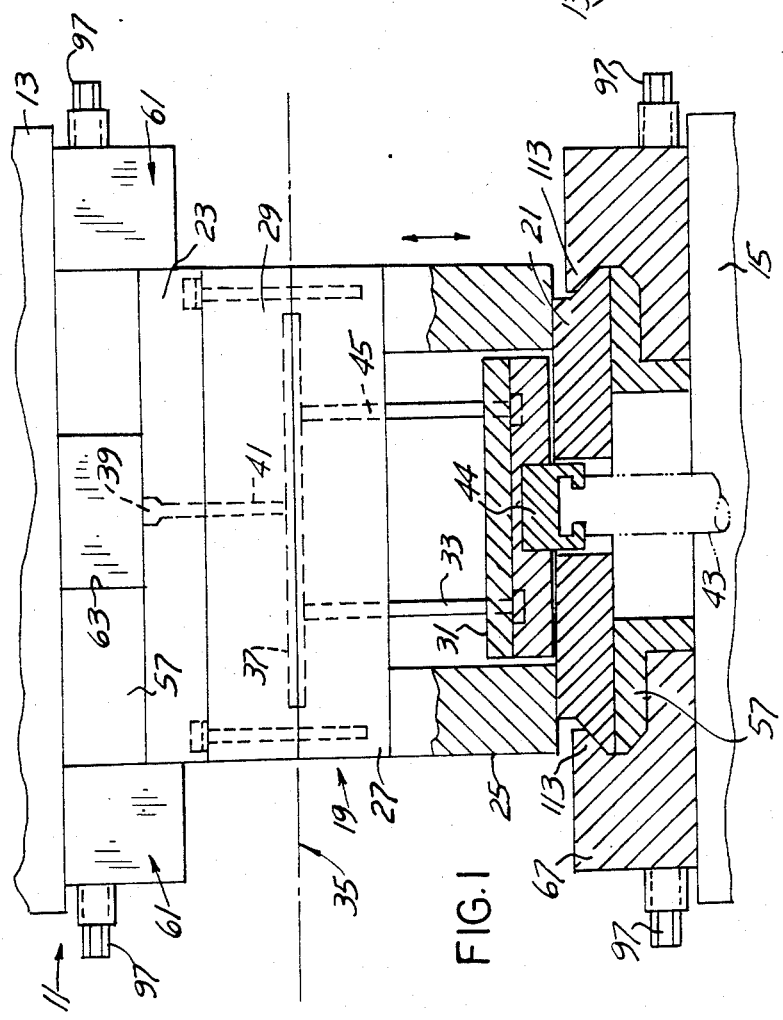
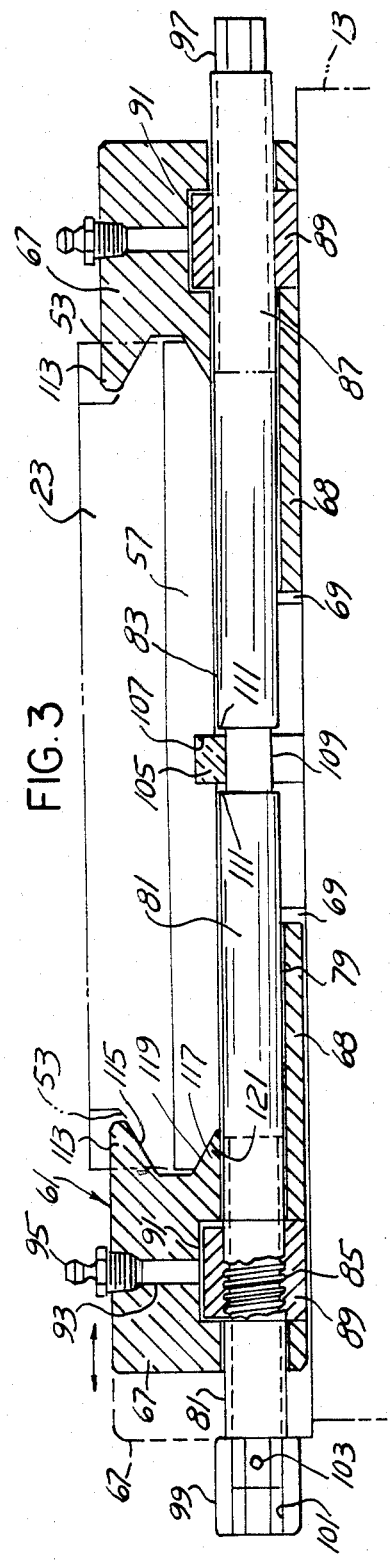

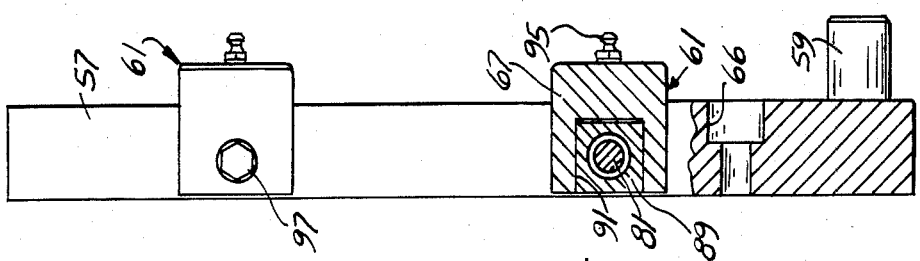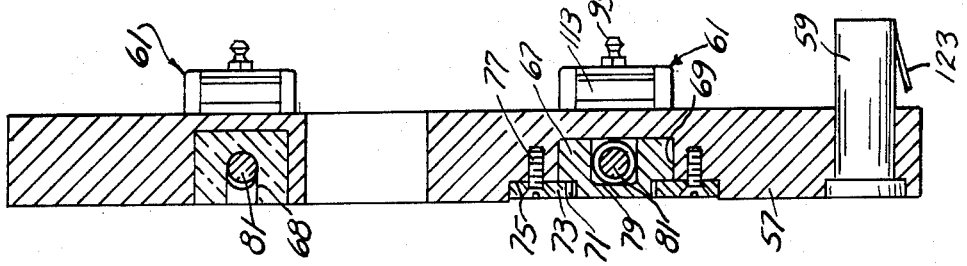

QUICK CHANGE LOCATOR CLAMP ASSEMBLY FOR PLASTIC MOLDING MACHINE

BACKGROUND OF THE INVENTION

Heretofore sectional plastic molding dies and die cast machines having stationary and movable clamp plates or clamping slots integral to the die have been removably positioned within and between stationary and movable platens of a molding machine and suitably secured thereto. Often the plastic molding or die cast machine may employ additional molding dies to replace the first mentioned molding die. The problem heretofore has been in the dissassembly of a sectional molding die from said platens and the reassembly of a different molding die thereon required a separate securing of the anchor plates thereof to the corresponding platens of the molding machine. Locating rings upon the cavity halves were needed to effectively align the cavity tools to the respective platens. This required considerable time in reanchoring and realigning successively the second or third molding die upon the molding machine so that the same molding machine may be used for a plurality of different molding operations including the use of separately employed molding sectional dies.

There has existed a need by which in a simple manner a first molding die may be quickly located and mounted upon the platens of a molding or die cast machine and secured thereon for a particular molding operation. Means are needed for unclamping a first molding die and locating and reassembling another molding die for a different job into the plastic molding or die cast machine and for clamping the same thereon.

Heretofore in properly locating molding dies with respect to the platens of a molding machine there have been employed retrofit plates and couplers, index blocks and locating rings.

SUMMARY OF THE INVENTION

An important feature of the present invention is to provide a quick change locator clamp assembly for a plastic molding or die cast machine having opposed movable and stationary platens adapted to receive, mount and support a sectional plastic or die cast molding die having stationary and movable clamp plates.

It is an important feature of the present invention to provide opposed inwardly facing symmetrical quick change locator clamp assemblies which are respectively mounted upon the platens of the plastic or die cast molding machine wherein each quick change locator clamp assembly includes body plate secured to a platen and has a laterally spaced pair of index pins mounted thereon and projecting therefrom. Correspondingly spaced keyhole slots within the corresponding edges of the clamp plates are adapted to cooperatively receive the index pins for locating the clamp plates relative to and against the body plates.

An important feature further includes upon each body plate longitudinally spaced opposed inwardly directed pairs of plate clamps adjustably and guidably mounted upon opposite sides of the body plate adapted to receive and retainingly engage opposite sides of a clamp plate.

Another feature includes rotatable screw means which interconnect each pair of clamps and which are rotatable in one direction for simultaneously moving each pair of clamps inwardly to operatively and retainingly engage a clamp plate for securing the clamp plates to the platens respectively.

Another feature includes rotatable screw means alternately rotatable in the opposite direction for moving each pair of clamps outwardly to disengage the clamp plates and for facilitating the removal of the sectional die and its clamp plates from the molding machine.

An important feature is to provide quick change locator clamp assemblies of symmetrical form adapted for mounting and securing upon respective platens of a plastic molding machine wherein each of the locator clamp assemblies includes a body plate secured to the platen. Cooperative means in the nature of pins and slots are provided upon the adjacent body plate and clamp plate for locating the clamp plates with respect to the platens. Upon the body plate there are provided longitudinally spaced opposed inwardly directed pairs of plate clamps which are adjustably and guidably mounted upon opposite sides of the body plate and are adapted on inward projection to retainingly engage opposite sides of a clamp plate. Rotatable screw means are provided between an adjacent pair of plate clamps. Upon rotation of the screw means such as a screw shaft in one direction, the clamps will simultaneously move inwardly for securing the clamp plate and upon rotation in the opposite direction, will retract the corresponding clamps in unison to disengage the adjacent clamp plate and to facilitate removal of the clamp plates and sectional die from the platens of the molding machine.

An important feature provides an improved rotatable screw means for effective simultaneous inward and outward movement of the corresponding plate clamps arranged in opposed pairs. There is employed an elongated screw shaft which extends through a transverse bore in the body plate and has right and left hand threads respectively upon its opposite ends in engagement with similarly threaded stationary nuts. Said nuts are solidly retained within the corresponding clamps so that upon rotation of the screw shaft in one direction, or the other, there will be corresponding inward or outward movements of the opposed pairs of plate clamps.

An important feature is to provide an improved support for the respective opposed pairs of plate clamps, guidably supporting and mounting the plate clamps upon the body plate for simultaneous inward and outward adjustments with respect to the corresponding clamp plates of a plastic molding die.

An important feature contemplates the use of at least a pair of parallel spaced transverse screw shafts operating in conjunction with longitudinally spaced opposed pairs of plate clamps so that upon the rotation in one direction of each of said screw shafts the corresponding clamps will be moved together in unison so as to simultaneously grip opposite sides of the clamp plates of a sectional plastic molding die.

These and other features and objects will be seen from the following Specification and claims in conjunction with the appended drawings.

THE DRAWINGS

FIG. 1 is a fragmentary partially sectioned plan view of molding machine platens and with the present molding die quick change locator clamps mounted thereon, for securing a sectional molding die.

FIG. 3 is a section taken in the direction of arrows 3—3 of FIG. 2, on an increased scale.

FIG. 4 is a fragmentary section taken in the direction of arrows 4—4 of FIG. 2.

FIG. 5 is a vertical section taken in the direction of arrows 5—5 of FIG. 2.

FIG. 6 is a vertical section taken in the direction of arrows 6—6 of FIG. 2.

FIG. 8 is a fragmentary rear view of a portion of the locator clamp assembly shown in FIG. 2.

FIG. 9 is a front elevational view of a clamp plate for a sectional plastic or die cast molding die.

FIG. 10 is an end elevational view thereof.

Figure 2:
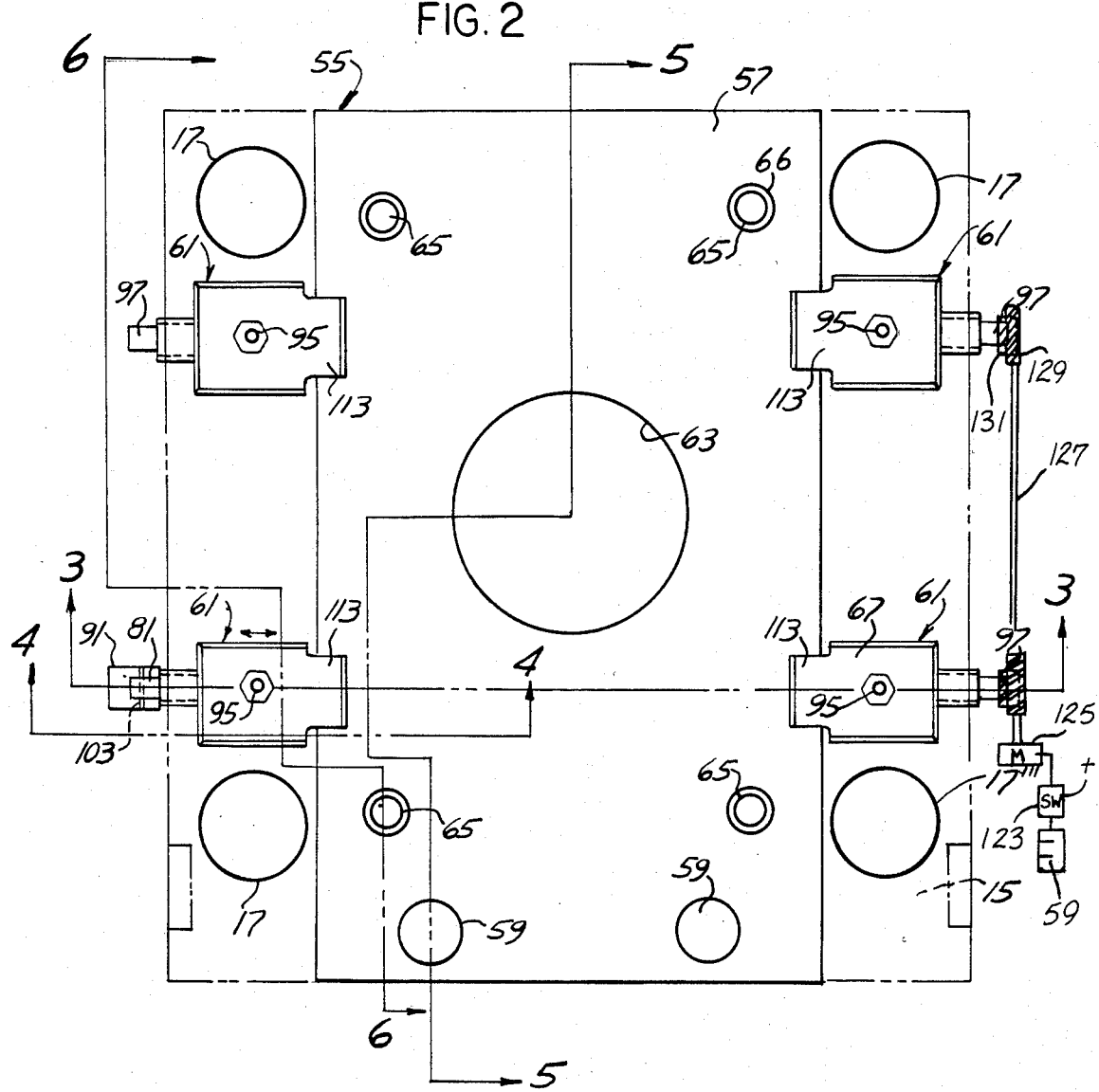
FIG. 2 is an elevational view of a quick change locator clamp assembly with the opposed pairs of plate clamps advanced to a clamp plate securing position, on an increased scale.

It will be understood that the above drawings illustrate merely a preferred embodiment of the invention and that other embodiments are contemplated within the scope of the claims hereafter set forth.

DETAILED DESCRIPTION OF AN EMBODIMENT OF THE INVENTION

Referring to the drawings, there is fragmentarily shown in FIG. 1 a conventional plastic or die cast molding machine 11, such as the well known 300 ton Cincinnati Molding Machine or a 28 ton Engel machine, which has the conventional stationary platen 13 and aligned therewith the conventional reciprocal platen 15. Extending between said platens for maintaining registry therebetween are pairs of laterally spaced guide rods 17, FIG. 2. As is conventional, the guide rods 17 are suitably secured to stationary platen 13, FIG. 1; and the reciprocal platen 15 has corresponding apertures therethrough for guidably receiving rods 17.

The conventional plastic or die cast molding machine, fragmentarily shown in FIG. 1, is adapted to receive a sectional injection plastic molding die 19, schematically shown, which includes a conventional movable clamp plate 21 and spaced therefrom a stationary clamp plate 23. As is conventional, clamp plate 21 is secured to the movable platen 15. Clamp plate 23 is secured to stationary platen 13.

The conventional sectional injection plastic or die cast die 19 normally includes a pair of spaced rails 25 of rectangular cross-section which are mounted upon and secured to clamp plate 21. A conventional core block 27 is mounted upon, spans and is suitably secured to rails 25. A conventional cavity plate 29 forms a part of the sectional injection plastic molding die, is guidably mounted upon and with respect to the core block 27 and is suitably secured to stationary clamp plate 23. A conventional ejector plate 31 is interposed between rails 25 is normally spaced from core block 27 and includes guide rods 33 secured thereto adapted for reciprocal movements within corresponding bores within said core block.

A parting line 35 is designated in FIG. 1 between the core block 27 and cavity plate 29, between which there is defined a mold cavity 37 for the molding of a plastic or die cast article of a predetermined shape. As is conventional, the clamp plate 23 has a centrally disposed sprew aperture 39 connected to passage 41 adapted for delivering pressurized plastic or metal material from the molding machine for entering the mold cavity 37.

Normally there are provided within the conventional plastic or die cast molding machine and extending through the movable platen 15 spaced pairs of conventional knock-out bars 43, one of which is fragmentarily shown in FIG. 1. These are adapted for connection at 44 to ejector plate 31. At a particular time during retraction of the movable platen 15 the connected ejector pins 45 move through corresponding bores within the core block 27, for lifting and separating the molded article from cavity 37 during separation of the sectional portions of the plastic or die cast molding die 19.

The foregoing description of the environment in which the present invention is applied is reasonably conventional and a further description of the detail, function and operation of the injection plastic or die cast molding die 19 is omitted. Plastic or die cast molding dies are conventional and well known in the art.

Within each of the molding clamp plates 21 and 23, FIGS. 9 and 10, for the sectional plastic or die cast molding die 19 of FIG. 1, there is provided at one edge, such as a bottom edge, a pair of laterally spaced locator slots 47, sometimes referred to as keyhole slots, whose inner ends 49 are semicircular and whose outer portions have diverging guides 51.

In one form of the clamp plates 21, 23 employed, there are provided opposed pairs of longitudinally spaced tapered clamp surfaces 53, FIGS. 9 and 10, which are adapted to cooperatively receive and be retainingly engaged by the opposed pairs of inwardly directed plate clamps 61. Said clamps are mounted in opposed longitudinally spaced pairs upon the clamp body plate 57, FIG. 7 and in FIGS. 2 and 3 on an increased scale.

For a particular molding machine and the respective movable and stationary platens 15 and 13 thereon, there is mounted the present quick change locator clamp assembly 55. Respective symmetrical locator clamp assemblies 55 are mounted upon the respective platens and suitably secured thereto. One of said locator clamp assemblies is described.

Each of the respective locator clamp assemblies 55 includes the rectangular body plate 57 suitably secured to the respective platens 13 and 15 by fasteners 65 which extend through a bore and counterbore 66, FIG. 6.

Mounted upon the lower end of body plate 57 are a pair of laterally spaced index pins 59, circular in cross-section, which are adapted to cooperatively receive locating slots 47, 49, FIG. 9, in the one edge of the respective clamp plates 21 and 23. Said clamp plates form a part of and are spaced and mounted upon opposite sides of the respective sections of plastic or die cast molding die 19 of FIG. 1. This provides a means of accurately locating the respective clamp plates upon the respective platens in such manner as to eliminate the use of the earlier retrofit plates and couplers, index blocks and locating rings, no longer required with the present quick change locator clamp assembly.

Figure 7:
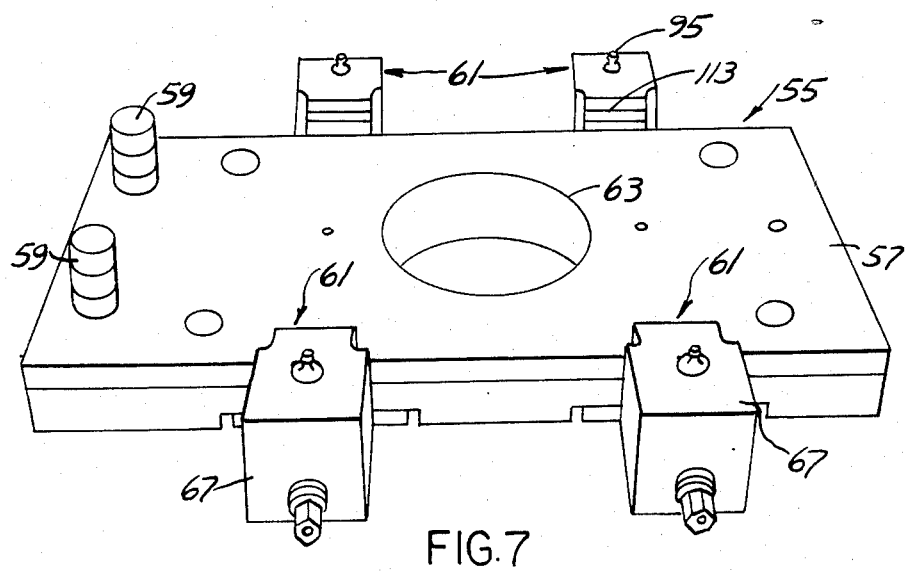
FIG. 7 is a front perspective view of a locator clamp assembly with the corresponding opposed pairs of plate clamps in the retracted position.

Once the respective clamp plates 21 and 23 of the molding die are properly located with respect to the corresponding platens and body plates 57 thereon, there is employed a manually operable screw clamp assembly by which the corresponding clamp plates 21, 23 of a molding die are effectively secured to the corresponding body plates 57, FIGS. 2, 3 and 7. Adjustably mounted upon opposite sides of body plate 57 are longitudinally spaced opposed pairs of clamps 61, shown in clamp plate securing position in FIGS. 2 and 3; also shown in dash line in retracted release position in FIG. 3. Stationary body plate 57 for the molding die 19 includes clearance aperture 63, FIGS. 1, 7 for a suitable feed pipe for delivering fluid plastic or metal material from the molding machine to sprue bushing 39. Each of the retainer clamps 61 includes a clamp body 67 which, as shown in FIGS. 2 and 3, is normally arranged laterally outward of the edges of body plate 57 and has connected thereto an inwardly directed mount bar 68, FIG. 4. Said bar is nested within a transverse undercut slot 69 formed within body plate 57.

Formed upon the undersurface of mount bar 68 along opposite sides are a pair of undercut slots 71 defining in said mount bar opposed pairs of stop shoulders 72. Laterally spaced pairs of gibs 73 are mounted within corresponding recesses 75 within body plate 57, FIG. 5 and secured to said body plate by fasteners 77. The corresponding gibs 73 supportably and guidably mount clamp body 67 and the connected mount bar 68 for transverse in and out movements with respect to body plate 57. Movements are limited in opposite directions by the stop shoulders 72, FIG. 8.

There is formed through clamp 61 including clamp body 67 and mount bar 68, elongated screw channel 79 within which is nested elongated control screw 81. Said control screw is further nested within and extends through the transverse bore 83 in body plate 57, FIG. 3, and at one end has a right hand thread 85. Upon its opposite end there is formed a left hand thread 87.

Block nuts 89 having corresponding threads and being replaceable, are non-rotatively mounted and retained within undercut recesses 91 within the clamp bodies 67 and retained therein as by a reasonably tight fit, FIG. 3. The nuts are utilized as a lower cost method of manufacture as opposed to threading the clamps directly. The latter would perform equally well.

Transverse passage 93 extends through body 67 to an interior space portion within the clamp body adjacent the corresponding nut 89. A grease fitting 95 is mounted upon body 67 at the outer end of passage 93. Said fitting allows for passage of a suitable lubricant to relieved areas of the nut and thence to threaded portions of the shaft 81.

Elongated transverse control screw 81 extends through bore 83 of the body plate 57 and through the corresponding bores 79 in clamps 61 and extends outwardly of opposite sides of the body plate, FIG. 3.

One end of the screw shaft, sometimes is referred to as a control screw, or as a rotatable screw means has thereon a hex formation 97 or of any other polygonal shape adapted to receive a wrench by which screw shaft 81 may be selectively rotated in one direction or the other. A power wrench could be employed.

On the opposite end of screw shaft 81, there is mounted a socket 99 which has in its end a corresponding polygonal bore 101 and which is secured to said shaft by transverse lock pin 103. The bore which is hexagonal in shape is adapted to receive a socket wrench or any other type of power operated wrench. This feature is intended as an optional method of transferring torque from the wrench unit to the shaft.

By providing the hex end 97 as well as the optional hex socket 99-101, the respective clamps may be simultaneously moved inwardly or outwardly by applying a wrench to either end of the screw 81.

A means is provided on body plate 57 operatively engageable with screw shaft 81 for preventing longitudinal movements of the screw shaft relative to said body plate. In the illustrative embodiment, there is provided a retainer block 105 which is press fitted into an slot 107 communicating with bore 83. Said block extends into an annular recess 109 formed intermediate the ends the screw shaft 81. Said recess defines a pair of opposed spaced stop shoulders 111 adjacent retainer block 105 to prevent relative longitudinal movements of screw shaft 81 with respect to body plate 57. Since the corresponding replaceable nuts 89 are retained in position within the respective clamp body 67 against rotation or longitudinal movement, manual rotation of screw shaft 81 in one direction or other will effect corresponding simultaneous inward or outward movements of the corresponding opposed pairs of clamps 61. The clearance between the retainer block 105 and stop shoulders 111 allows for a self-centering condition of clamp bodies 67 and tapered portions 53 of clamp plates 21 and 23. This reduces the need for extreme accuracy in the placement of clamp slots 53.

As shown in FIGS. 3 and 4, each of the corresponding clamp bodies 67 includes an inwardly directed gripper finger 113 which has a tapered undersurface 115 inclined at an acute angle with the top of body 67.

On rotation of the screw shaft 81 in one direction the corresponding clamps 61 will be moved inwardly with respect to the die clamp plate 23. Corresponding gripper fingers 113 cooperatively bear against the tapered portions 53 spaced in pairs upon opposite sides of the die clamp plates 21, 23, FIGS. 9 and 10.

Mounted upon the clamp body 67 and spaced from the corresponding gripper finger 113 is a gripper stop 117 which has an outward taper 119 adapted for cooperative engaging registry with corresponding body plate taper stop 121 upon an undersurface portion of body plate 57, in FIG. 3.

In normal operation, the control screw 81 is rotated with respect to the adjacent opposed pair of clamps 61 such that their corresponding clamp fingers 113 are retracted from the position shown in FIG. 3 to the dash line position shown. Thus, the gripper fingers 113 are arranged normally outward of the outer edges of the corresponding body plate 57. This provides a sufficient clearance for movement of the corresponding die anchor plates 21 and 23 between the respective opposed pairs of clamps 61 and said plates and the intermediate plastic die assembly 19 are lowered down into the molding machine and the locating slots 47 in the die clamp plates are cooperatively nested over the corresponding index pins 59 which project from lower portions of body plate 57, FIG. 7.

When properly located with respect to the corresponding body plates 57 secured to the adjacent platens, simple rotation of the control screw shaft 81 in one direction will effect the simultaneous inward movement of the respective clamps 61 so as to operatively and retainingly engage corresponding edge portions 53 of the die clamp plates, FIG. 1.

The present symmetrical opposed quick change clamp assemblies 55 may be used upon molding machines in the range of 28 to 400 ton.

By the use of the pair of index pins 59 preferably at the lower end of body clamp plate 57, there is provided a means for receiving the corresponding keyhole slots 47-49 in the corresponding die clamp plates, such that the clamp plates and the molding die assembly, FIG. 1 are properly indexed and located with respect to the platens of the molding machine.

The present quick change plate clamp assemblies 55, are secured to the corresponding platens of the molding machine.

For installation of a particular mold, such as the mold assembly 19, FIG. 1, the die clamp plates are placed over the index pins. The molding die 19 is clamped to the molding machine 11. The two screw shafts 81 for each of the body plates 57 are driven home for securing the one mold assembly in position. The clamps 61 move inward in unison to clamping position, FIG. 3. No locating rings are required on the mold and no index blocks are required. Once the particular mold assembly is used for molding a plurality of parts, it may be easily removed from the molding machine. This is accomplished by rotating the corresponding pairs of screw shafts in the opposite direction so as to simultaneously retract the corresponding clamps 61. The mold assembly 19 is lifted out of the molding machine. In its place may be substituted another sectional plastic molding assembly 19 having different mold cavities wherein reassembly is simply by dropping the additional mold and its associated clamp plates 21 and 23 so that the index slots 47 are in registry with and receive the corresponding index pins 59 upon the respective body plates 57. Once that has occured, it is a simple matter to merely rotate the screw shafts 81 to simultaneously draw inwardly the corresponding plate clamps 61 to operatively and retainingly engage the corresponding die clamp plates.

MODIFICATION

Two shafts 81 could be gear driven from a third transverse shaft to reduce the wrenching points or to permit motorization, resulting in a totally automated unit. With the index pins 59 fitted with a suitable switching device 123, FIGS. 2 and 5, when the mold is set and indexed, the motor 125 is energized, FIG. 2. Said motor simultaneously rotates the transverse shaft 127 mounting gears 129 in mesh with gears 131 on lead screws 81. Screw shafts 81 rotate in unison and simultaneously move the clamps 61 inwardly. The transverse shaft 127 at right angles to the shafts 81 through the gears 129 and 131 cause the shafts to be simultaneously rotated from a single point.

Having described my invention, reference should now be had to the following claims:

I claim:

1. In a plastic or die cast molding machine having opposed stationary and movable platens adapted to receive, mount and support a sectional plastic molding die having opposed stationary and movable guidably interconnected clamps plates comprising;
    opposed inwardly facing symmetrical quick change locator clamp assemblies mounted upon said platens;
    each clamp assembly including a body plate bearing against and secured to a platen;
    laterally spaced index pins mounted upon said body plate and projecting outwardly thereof;
    there being correspondingly spaced keyhole slots within the corresponding edges of said clamp plates adapted to cooperatively receive said pins for locating said clamp plates relative to and against said body plates respectively;
    longitudinally spaced opposed inward directed pairs of plate clamps adjustably and guidably mounted upon opposite sides of said body plate adapted to receive and retainingly engage opposite sides of a clamp plate;
    and rotatable screw means interconnecting each pair of clamps rotatable in one direction for simultaneously moving each pair of clamps inwardly to operatively and retainingly engage a clamp plate for securing said clamp plates to said platens respectively;
    and alternately rotatable in the opposite direction for moving each pair of clamps outwardly to disengage said clamp plates to facilitate removal of said sectional die and clamp plates from said platens.

2. In the locator clamp assembly of claim 1, said locator slots having diverging entrant openings to facilitate assembly of the respective clamp plates over said index pins.

3. In the locator clamp assembly of claim 1, said index pins being circular in cross-section, the inner ends of said locator slots being semi-circular.

4. In the locator clamp assembly of claim 1, each plate clamp including a clamp body, when retracted arranged laterally outward of said body plate;
    a mount bar upon said clamp body slidably mounted upon said body plate within an undercut recess therein;
    said mount bar having undercut side slots for a portion of its length defining pairs of spaced stops;
    and a pair of gibs mounted within the undersurface of said body plate and retainingly extending into said undercut side slots, alternately engageable with said stops.

5. In the locator clamp assembly of claim 1, each plate clamp including a clamp body when retracted arranged laterally outward of said body plate;
    a mount bar connected to said body slidably mounted upon said body plate within an undercut recess therein;
    and at least one gib mounted upon said body plate underlying and guidably retaining said mount bar for reciprocal movements relative to said mount plate.

6. In the locator clamp assembly of claim 5, said undercut recesses extending at right angles to said mount plate.

7. In the locator clamp assembly of claim 5, opposed inwardly directed undercut gripper fingers upon each clamp body operatively engaging an adjacent clamp plate.

8. In the locator clamp assembly of claim 7, said gripper fingers having a tapered undersurface;
    each clamp plate upon its opposite sides having opposed pairs of longitudinally spaced similarly inclined clamp surfaces receiving said gripper fingers respectively.

9. In the locator clamp assembly of claim 8, a tapered stop upon each clamp body opposed to its gripper finger, said body plate having formed therein corresponding tapered stop surfaces to cooperatively receive said tapered stops respectively.

10. In the locator clamp assembly of claim 1, said screw means including an elongated screw shaft extending through a transverse bore in said body plate with its ends projecting outwardly of said body plate;
    means upon said body plate retainingly engaging said screw shaft against longitudinal movements;
    there being right and left hand threads upon said shaft adjacent its outer ends;
    and similarly threaded stationary nuts mounted within an opposed pair of plate clamps receiving said threads respectively;

said screw shaft ends having means thereon to facilitate engagement of a tool for rotating said screw shaft at either end thereof.

11. In the locator clamp assembly of claim 10, said means retainingly engaging said screw shaft including a retainer block mounted upon said body plate adjacents its bore and extending into an angular groove in said screw shaft.

12. In the locator clamp assembly of claim 10, there being a transverse passage in each plate clamp; and a grease fitting upon said clamp communicating with said passage.

13. In the locator clamp assembly of claim 10, the means on said screw shaft ends including a polygonal surface and polygonal slot on said opposite ends respectively.

14. In the locator clamp of claim 1, first gears mounted upon the one ends of said rotatable screw means;
   a reversable electric motor mounted upon a support having a drive shaft extending transversely of said screw means;
   and a pair of spaced second gears upon said drive shaft in mesh with said first gears for simultaneously rotating said screw means.

15. In the locator clamp of claim 14, a switch mounted upon one of said index pins and connected to said motor whereby when the molding die is set and indexed, said motor is automatically energized to effect simultaneous inward movement of said clamp assemblies.

* * * * *